(12) United States Patent
Lorenz

(10) Patent No.: US 11,884,389 B2
(45) Date of Patent: Jan. 30, 2024

(54) WING FOR AN AIRCRAFT

(71) Applicant: AIRBUS OPERATIONS GMBH, Hamburg (DE)

(72) Inventor: Christian Lorenz, Hamburg (DE)

(73) Assignee: AIRBUS OPERATIONS GmbH, Kreetslag (DE)

( * ) Notice: Subject to any disclaimer, the term of this patent is extended or adjusted under 35 U.S.C. 154(b) by 249 days.

(21) Appl. No.: 17/427,389

(22) PCT Filed: Jun. 24, 2020

(86) PCT No.: PCT/EP2020/067708
§ 371 (c)(1),
(2) Date: Jul. 30, 2021

(87) PCT Pub. No.: WO2020/260394
PCT Pub. Date: Dec. 30, 2020

(65) Prior Publication Data
US 2022/0126980 A1 Apr. 28, 2022

(30) Foreign Application Priority Data

Jun. 28, 2019 (DE) ..................... 10 2019 117 606.9

(51) Int. Cl.
*B64C 3/56* (2006.01)
*F16H 25/22* (2006.01)
(Continued)

(52) U.S. Cl.
CPC ................ *B64C 3/56* (2013.01); *B64U 20/50* (2023.01); *F16H 25/2204* (2013.01); *F16H 2025/2081* (2013.01)

(58) Field of Classification Search
CPC ....... B64C 3/56; B64U 20/50; F16H 25/2204; F16H 2025/2081
See application file for complete search history.

(56) References Cited

U.S. PATENT DOCUMENTS 2,533,429 A 12/1950 Carpenter
3,469,806 A 9/1969 Olchawa
(Continued)

FOREIGN PATENT DOCUMENTS

EP 3 000 723 3/2016
EP 3 254 956 12/2017

OTHER PUBLICATIONS

International Search Report for PCT/EP2020/067708, dated Oct. 15, 2020, 4 pages.
(Continued)

*Primary Examiner* — Rodney A Bonnette
(74) *Attorney, Agent, or Firm* — Nixon & Vanderhye P.C.

(57) ABSTRACT

A wing for an aircraft is disclosed having a fixed wing, a foldable wing tip portion and a flight latch device for latching the foldable wing tip portion in the extended position, wherein the flight latch device includes a housing, a latch bolt, and a motor for driving the latch bolt between the latched and unlatched positions. A flight latch device includes a threaded shaft rotationally driven by the motor, a nut engaging the shaft, so that the nut can rotate relative to the shaft, the nut is connected to the housing via a linear guide and is connected to the latch bolt for common linear movement with the latch bolt, and the flight latch device includes an offset compensation, providing that the shaft is supported pivotable relative to the housing and the latch bolt is coupled to the nut via a compensational bearing allowing angular play between the nut and the latch bolt.

16 Claims, 5 Drawing Sheets

(51) Int. Cl.
*B64U 20/50* (2023.01)
*F16H 25/20* (2006.01)

(56) References Cited

U.S. PATENT DOCUMENTS

| | | | |
|---|---|---|---|
| 5,129,273 | A | 7/1992 | Fukui et al. |
| 5,201,479 | A | 4/1993 | Renzelmann |
| 5,310,138 | A | 5/1994 | Fitzgibbon |
| 5,558,299 | A | 9/1996 | Veile |
| 2007/0062317 | A1 | 3/2007 | Nagai et al. |
| 2015/0097087 | A1 | 4/2015 | Sakurai et al. |
| 2017/0152017 | A1* | 6/2017 | Good .................. B64C 3/56 |
| 2018/0148159 | A1 | 5/2018 | Good et al. |
| 2018/0320767 | A1 | 11/2018 | Crine et al. |
| 2020/0096105 | A1* | 3/2020 | Kamila ................. F16C 11/10 |
| 2022/0135205 | A1* | 5/2022 | Lorenz .................. B64C 3/56 |
| | | | 244/49 |

OTHER PUBLICATIONS

Written Opinion of the ISA for PCT/EP2020/067708 dated Oct. 15, 2020, 7 pages.
German Search Report for DE10 2019 117 606.9, dated Feb. 24, 2020, 6 pages.

\* cited by examiner

WING FOR AN AIRCRAFT

CROSS REFERENCE TO RELATED APPLICATIONS

The present application is a National Phase of International Application Number PCT/EP2020/067708, filed Jun. 24, 2020, which designated the U.S. and claims priority benefits from German Patent Application Number DE 10 2019 117 606.9, filed Jun. 28, 2019, the entire contents of each of which are hereby incorporated by reference.

BACKGROUND AND SUMMARY

The present invention relates to a wing for an aircraft, in particular to a foldable wing including a fixed wing and a foldable wing tip portion. A further aspect of the invention relates to a flight latch device for latching the foldable wing tip portion of such a wing for an aircraft in an extended position with respect to the fixed wing. Yet a further aspect of the invention relates to an aircraft comprising such a wing and/or such a flight latch device.

Such a wing comprises a fixed wing for being mounted to a fuselage, and a foldable wing tip portion mounted to the fixed wing via a hinge or hinges rotatable about a hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the hinge axis extends in a horizontal plane and/or in parallel to a chord line and/or in parallel to the wing surface and/or in a flight direction of the aircraft. Alternatively, when the foldable wing tip portion is foldable rearwards, the hinge axis extends in a vertical direction and/or in a wing depth direction and/or in a direction transverse or perpendicular to the wing surface.

Preferably, the wing also comprises an actuation unit for actuating the foldable wing tip portion for movement about the hinge axis relative to the fixed wing, i.e. for movement between the extended and the folded positions. The actuation unit might be formed in various ways, e.g. as a rack and pinion drive, and might be mounted between the fixed wing and the foldable wing tip portion near the hinge axis.

The wing further comprises a flight latch device for latching the foldable wing tip portion in the extended position. The flight latch device comprises a housing, a latch bolt, and a motor. The housing is fixedly mounted to one of the fixed wing and the foldable wing tip portion. The term "housing" within the meaning of the invention includes any load bearing base structure of the flight latch device and is not limited to a mere outer casing. The latch bolt extends elongated along a latch axis, is supported at the housing, preferably inside the housing, and is linearly movable relative to the housing along the latch axis between a latched position, where the latch bolt engages corresponding latch lugs of the foldable wing tip portion and/or the fixed wing, and an unlatched position, where the latch bolt is disengaged with the latch lug of at least one of the foldable wing tip portion and the fixed wing. Preferably, the housing is mounted to the fixed wing and the latch bolt in the latched position engages latch lugs of both the fixed wing and the foldable wing tip portion, while in the unlatched position the latch bolt is disengaged at least from the latch lug or lugs of the foldable wing tip portion, preferably from the latch lugs of both the foldable wing tip portion and the fixed wing. The motor is preferably an electric and/or hydraulic and/or pneumatic motor and is supported at the housing and/or at the latch bolt and is configured for driving the latch bolt between the latched position and the unlatched position.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

When the latch bolt is in the latched position under load by the latch lugs, the latch bolt might elastically deform or move inside the latch lugs, so that the latch axis might be slightly out of alignment or offset from the latch axis or the housing. Such an offset or misalignment should, however, be tolerated in order to avoid constraining forces.

Accordingly, the object of the present invention is to provide a wing having a flight latch device with a simple and efficient offset compensation.

This object is achieved in that the flight latch device comprises a threaded shaft, such as a spindle, extending elongated along a shaft axis, having an external thread and being rotationally driven by the motor. Preferably, the shaft is also supported by its one end at the housing in a way that the shaft is rotatable about the shaft axis and fixed in the direction of the shaft axis. The flight latch device comprises a nut having an internal thread engaging the external thread of the shaft, so that the nut can rotate about the shaft along the external thread. The nut, in turn, is connected to the housing by a linear guide allowing linear movement of the nut relative to the housing and inhibiting rotation of the nut relative to the housing. The nut might be connected to the linear guide directly or indirectly e.g. via the latch bolt or other parts. Further, the nut is connected to the latch bolt for common linear movement with the latch bolt, preferably by a linearly fixed connection, in a torque proof or torque free manner. The flight latch device further comprises an offset compensation. The offset compensation provides that the shaft is supported in a way that it is slightly pivotable, i.e. has a certain pivot play, relative to the housing. Specifically, the shaft axis may pivot relative to the housing. Further, the latch bolt is coupled to the nut via a compensational bearing allowing angular play, i.e. pivot play, between the nut and the latch bolt, specifically between the shaft axis and the latch axis. The latch bolt might be coupled to the nut directly or indirectly, e.g. via a carrier sleeve so that the compensational bearing would be arranged between the nut and the carrier sleeve.

In such a way, a flight latch device with a very simple and efficient offset compensation is provided for the latch bolt. When the motor is switched on, the shaft is rotated about the shaft axis, which causes the nut to move linearly along the linear guide, which in turn causes linear motion of the latch bolt coupled to the nut, between the latched and unlatched positions. When the latch bolt is deformed or displaced in the latched position due to high loads applied by the latch lugs, the offset compensation formed by the shaft being mounted with pivot play relative to the housing and the latch bolt being connected to the nut with pivot play, provides that no or only little constraining forces occur due to the deformation or movement of the latch bolt.

According to a preferred embodiment, the shaft is formed as ball screw and the nut is formed as ball nut so that the internal thread of the nut engages the external thread of the shaft by a ball bearing including balls running in corresponding grooves of the internal and external threads. In such a way, a very low friction bearing is provided.

According to another preferred embodiment, the latch bolt is formed hollow and has an axial bore along the latch axis, wherein the shaft extends inside the bore. In such a way, a very compact design is enabled.

According to a yet another preferred embodiment, the shaft is rotationally driven by the motor via a gear unit, wherein one end of the shaft is coupled to the gear unit via a crowned spline joint. Preferably, the crowned spline joint includes a crowned spline at the shaft, i.e. external teeth extending in axial direction on a circumferential concave or bulge-shaped portion of the shaft, meshingly engaging with mating, crowned internal teeth of a corresponding internal gear wheel of the gear unit arranged coaxially around the one end of the shaft. The internal gear wheel preferably also has external teeth which are engaged by a further gear wheel of the gear unit or by a drive pinion or drive shaft of the motor. By use of a crowned spline the shaft is pivotable relative to the housing without being disengaged from the internal gear wheel and thus from the gear unit and the related power transmission from the motor. In other words, the crowned spline allows continuous engagement with the internal gear wheel even when the shaft is pivoted relative to the housing.

According to another preferred embodiment, the compensational bearing is formed as a compensational ball bearing providing axial coupling along the shaft axis and/or the latch axis, free relative rotation about the shaft axis and/or the latch axis, and angular play, i.e. pivot play, between the nut and the latch bolt. Such a compensational ball bearing might be formed by the balls being arranged with play in the axial direction. By such a compensational ball bearing the latch bolt and the nut are rotationally decoupled, which might be advantageous for various reasons.

In particular, it is preferred that the nut is directly connected to the linear guide, wherein the linear guide comprises a slider mounted to one of the nut and the housing, and running in a corresponding groove in the respective other of the nut and the housing. In such a way, the linear guide transforms the rotation of the shaft into linear motion of the nut.

According to an alternative preferred embodiment, the compensational bearing is formed as a compensational ball stud bearing which, similar as a cardan bearing, provides axial coupling along the shaft axis and/or the latch axis, rotational coupling about the shaft axis and/or the latch axis, and angular play, i.e. pivot play, between the nut and the latch bolt. By such a ball stud bearing the latch bolt and the nut are rotationally coupled, which might also be advantageous for several reasons, such as friction loss and further options for the arrangement of the linear guide.

In particular, it is preferred that the ball stud bearing comprises at least one ball stud mounted to the nut and projecting away from an outer surface of the nut in a radial direction. The ball stud bearing preferably further comprises a carrier sleeve fixedly connected to the latch bolt, i.e. fixedly mounted to or formed integrally with the latch bolt, extending coaxially inside the latch bolt, extending at least partially coaxially around the nut, i.e. externally to the nut, and having at least one bearing cavity extending in the radial direction, opening inwards, and receiving the at least one ball stud with a defined play in axial, circumferential and radial direction. The bearing cavity comprises two parallel flat axial bearing surfaces extending perpendicular to the latch axis, two opposite flat circumferential bearing surfaces extending in a radial cross section along the latch axis, and one circular radial bearing surface extending circumferentially perpendicular to the radial direction of the carrier sleeve. In such a way, a very simple and efficient compensational bearing with rotational coupling is formed.

In particular, it is preferred that the ball stud bearing comprises four ball studs at the nut and four corresponding bearing cavities at the carrier sleeve. Preferably, the ball studs and the bearing cavities are arranged at the same axial position. By using four ball studs a pivot play in any direction is enabled, similar as it is the case in a cardan joint.

In particular, it is preferred that the ball studs and the bearing cavities are arranged equally spaced from one another in the circumferential direction. By arranging the ball studs and bearing cavities symmetrically with equal distance to one another, the ball studs and bearing cavities can be formed equally with the same dimensions to provide the same amount of pivot play.

Alternatively, it is preferred that the ball studs and the bearing cavities are arranged in two opposite pairs that are arranged symmetrically to one another around the circumference of the nut. The distance within one pair is smaller than the distance between the pairs, i.e. from one pair to another. In other words, the distance between adjacent ball studs and bearing cavities is alternating between two different values around the nut. By providing the ball studs and bearing cavities in opposite pairs, the space between the pairs might be used for other parts, such as the linear guide.

It is further preferred that the ball studs have the form of a pin anchored in the nut by its one end and having an extended head in the form of a ball at its opposite end. Such ball studs having a ball shaped head provide an edgeless contact surface for contact with all internal surfaces of the bearing cavities.

It is also preferred that the nut is directly connected to the linear guide, wherein the linear guide comprises a slider mounted to one of the nut and the housing, and running in a corresponding groove in the respective other of the nut and the housing. Alternatively, it is preferred that the nut is indirectly connected to the linear guide through the latch bolt, wherein the linear guide comprises a slider mounted to one of the latch bolt and the housing, and running in a corresponding groove in the respective other of the latch bolt and the housing, while the latch bolt in turn is coupled to the nut. Alternatively, it is also preferred that the nut is indirectly connected to the linear guide through the carrier sleeve, wherein the linear guide comprises a slider mounted to one of the carrier sleeve and the housing, and running in a corresponding groove in the respective other of the carrier sleeve and the housing, while the carrier sleeve in turn is coupled to the nut. Since the nut, the carrier sleeve and the latch bolt are coupled in a torque proof manner, the linear guide might be provided at any of these.

A further aspect of the present invention relates to a flight latch device for latching a foldable wing tip portion of a wing for an aircraft in an extended position relative to a fixed wing, as used in the wing according to any of the aforedescribed embodiments. The features and effects described above in connection with the wing apply vis-à-vis to the flight latch device. Specifically, the flight latch device comprises a housing, a latch bolt, and a motor. The housing is configured to be fixedly mounted to one of the fixed wing and the foldable wing tip portion. The latch bolt extends elongated along a latch axis, is supported at the housing and is linearly movable relative to the housing along the latch axis between a latched position, where the latch bolt is configured to engage corresponding latch lugs of the foldable wing tip portion and/or the fixed wing, and an unlatched position, where the latch bolt is configured to be disengaged with the latch lug of at least one of the foldable wing tip portion and the fixed wing. Preferably, the housing is configured to be mounted to the fixed wing and the latch bolt in the latched position is configured to engage latch lugs of both the fixed wing and the foldable wing tip portion, while in the unlatched position the latch bolt is configured to be disengaged at least from the latch lug or lugs of the foldable wing tip portion, preferably from the latch lugs of both the foldable wing tip portion and the fixed wing. The motor is preferably an electric and/or hydraulic and/or pneumatic motor and is supported at the housing and/or at the latch bolt and is configured for driving the latch bolt between the latched position and the unlatched position. The flight latch device the flight latch device comprises a threaded shaft, such as a spindle, extending elongated along a shaft axis, having an external thread and being rotationally driven by the motor. Preferably, the shaft is also supported by its one end at the housing in a way that the shaft is rotatable about the shaft axis and fixed in the direction of the shaft axis. The flight latch device comprises a nut having an internal thread engaging the external thread of the shaft, so that the nut can rotate about the shaft along the external thread. The nut, in turn, is connected to the housing by a linear guide allowing linear movement of the nut relative to the housing and inhibiting rotation of the nut relative to the housing. The nut might be connected to the linear guide directly or indirectly e.g. via the latch bolt or other parts. Further, the nut is connected to the latch bolt for common linear movement with the latch bolt, preferably by a linearly fixed connection, in a torque proof or torque free manner. The flight latch device further comprises an offset compensation. The offset compensation provides that the shaft is supported in a way that it is slightly pivotable, i.e. has a certain pivot play, relative to the housing. Specifically, the shaft axis may pivot relative to the housing. Further, the latch bolt is coupled to the nut via a compensational bearing allowing angular play, i.e. pivot play, between the nut and the latch bolt, specifically between the shaft axis and the latch axis. The latch bolt might be coupled to the nut directly or indirectly, e.g. via a carrier sleeve so that the compensational bearing would be arranged between the nut and the carrier sleeve. In such a way, a simple and reliable flight latch device with efficient offset compensation is formed.

Yet a further aspect of the present invention relates to an aircraft comprising a wing according to any of the embodiment described above or a flight latch device according to any of the embodiment described above. The features and effects described above in connection with the wing and the flight latch device apply vis-à-vis to the aircraft.

BRIEF DESCRIPTION OF THE DRAWINGS

Hereinafter, a preferred embodiment of the invention is described in more detail by mean of a drawing. The drawing shows in FIG. 1 a perspective view of an aircraft according to an embodiment of the invention, FIG. 2 a perspective detail view of a flight latch device at a wing of the aircraft shown in FIG. 1, FIG. 3 a cross sectional view along the latch and shaft axes of the flight latch device shown in FIG. 2, FIG. 4 a detail view of the crowned spline joint from FIG. 3, and FIG. 5 a detail view of the ball stud bearing from FIG. 3.

DETAILED DESCRIPTION OF SOME EMBODIMENTS

Figure 1:
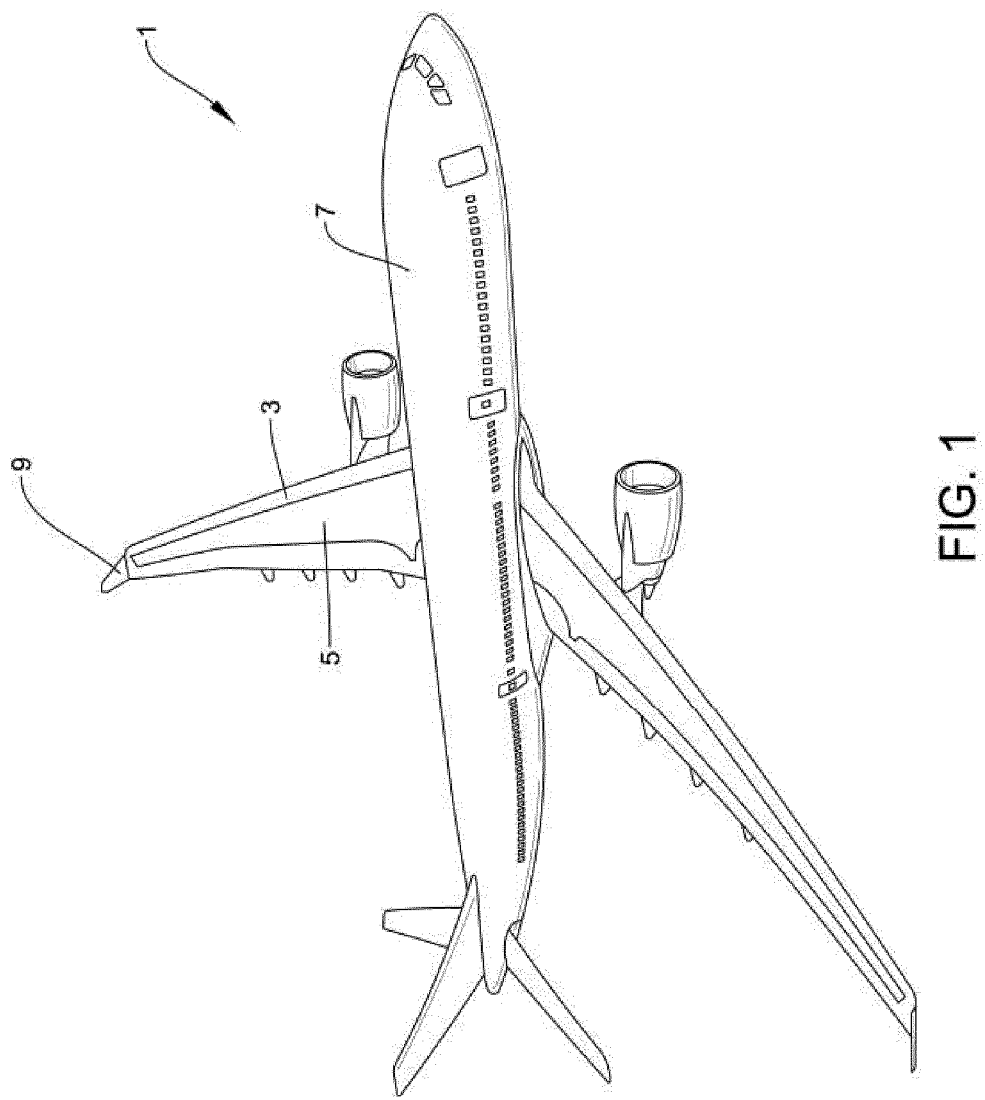

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
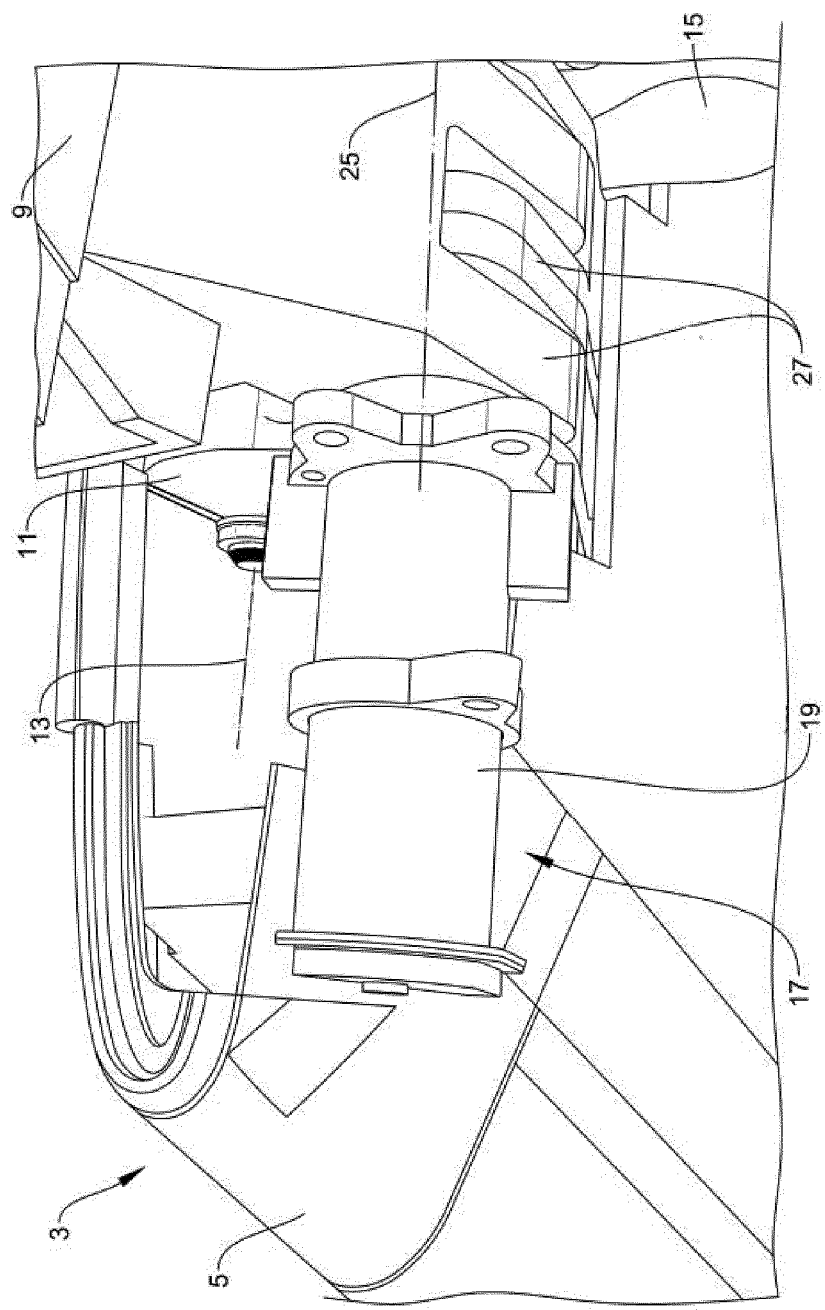

FIG. 2 illustrates the wing 3 of the aircraft 1 shown in FIG. 1 in further detail. The foldable wing tip portion 9 is mounted to the fixed wing 5 via hinges 11 rotatable about a hinge axis 13 between an extended position and a folded position. In the extended position the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1. Further, the wing 3 comprises an actuation unit 15 for moving the foldable wing tip portion 9 about the hinge axis 13 relative to the fixed wing 5.

As shown in FIGS. 2 to 5, the wing 3 further comprises a flight latch device 17 for latching the foldable wing tip portion 9 in the extended position. The flight latch device 17 comprises a housing 19, a latch bolt 21, and a motor 23. The housing 19 is fixedly mounted to the fixed wing 5. The latch bolt 21 extends elongated along a latch axis 25, is supported inside the housing 19 and is linearly movable relative to the housing 19 along the latch axis 25 between a latched position, where the latch bolt 21 engages corresponding latch lugs 27 of the foldable wing tip portion 9 and the fixed wing 5, and an unlatched position, where the latch bolt 21 is disengaged from the latch lugs 27 of at least the foldable wing tip portion 9. The motor 23 is an electric motor, is supported at the housing 19 and is configured for driving the latch bolt 21 between the latched position and the unlatched position. In the unlatched position, the latch bolt 21 is supported in the housing 19 by a linear bearing 28. In the latched position, the latch bolt 21 is not supported by the linear bearing 28. While moving from the unlatched to the latched position, the latch bolt 21 is supported by the linear bearing 28 until it approaches the latched position. In the drawings the latch bolt 21 is not shown in a position in which it is supported by the linear bearing 28.

Figure 3:
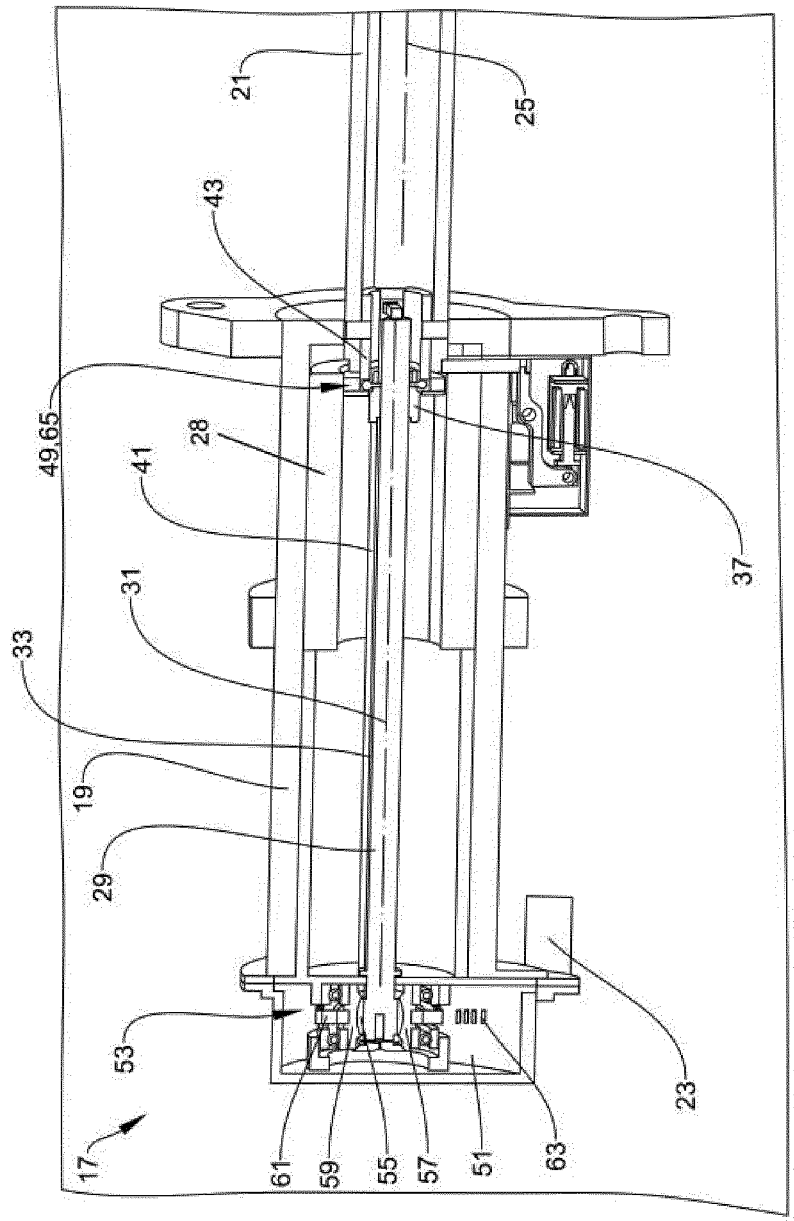

As visible in the cross sectional view of FIG. 3, the flight latch device 17 comprises a threaded shaft 29 that extends elongated along a shaft axis 31 and that is rotationally driven by the motor 23. Also, the shaft 29 is provided with an external thread 33 and extends inside an axial bore 35 in the latch bolt 21. The shaft 29 is further supported by its one end at the housing 19 in a way that the shaft 29 is rotatable about the shaft axis 31 and fixed in the direction of the shaft axis 31 relative to the housing 19.

The flight latch device 17 further comprises a nut 37 having an internal thread 39 engaging the external thread 33 of the shaft 29, so that the nut 37 can rotate about the shaft 29 along the external thread 33. In the present embodiment, the shaft 29 is formed as ball screw and the nut 37 is formed as ball nut so that the internal thread 39 of the nut 37 engages the external thread 33 of the shaft 29 by a ball bearing including balls running in corresponding groove of the internal and external threads 39, 33. The nut 37, in turn, is connected to the housing 19 by a linear guide 41 allowing linear movement of the nut 37 relative to the housing 19 and inhibiting rotation of the nut 37 relative to the housing 19. In the present embodiment, the nut 37 is connected to the linear guide 41 indirectly via a carrier sleeve 43, wherein the linear guide 41 comprises a slider 45 mounted to the housing 19 and running in a corresponding groove 47 in the carrier sleeve 43, while the carrier sleeve 43 in turn is coupled to the nut 37. Further, the nut 37 is connected to the latch bolt 21 for common linear movement with the latch bolt 21.

The flight latch device 17 further comprises an offset compensation. The offset compensation provides that the shaft 29 is supported in a way that it is slightly pivotable, i.e. has a certain pivot play, relative to the housing 19, specifically between the housing 19 and the latch axis 25. Further, the latch bolt 21 is coupled to the nut 37 via a compensational bearing 49 allowing angular play, i.e. pivot play, between the nut 37 and the latch bolt 21, specifically between the shaft axis 31 and the latch axis 25. The latch bolt 21 is coupled to the nut 37 indirectly via the carrier sleeve 43 so that the compensational bearing 49 is arranged between the nut 37 and the carrier sleeve 43. In the exemplary embodiment shown in the drawings, offset compensation is only possible when the latch bolt 21 is in the extended or latching position where it is not supported by the linear bearing 28. In other words, the latch bolt 21 needs to be moved from the unlatched to the latched position until it disengages from the linear bearing 28 before the offset compensation is enabled. In other embodiments, offset compensation may also possible in the retracted or unlatched position.

Figure 4:
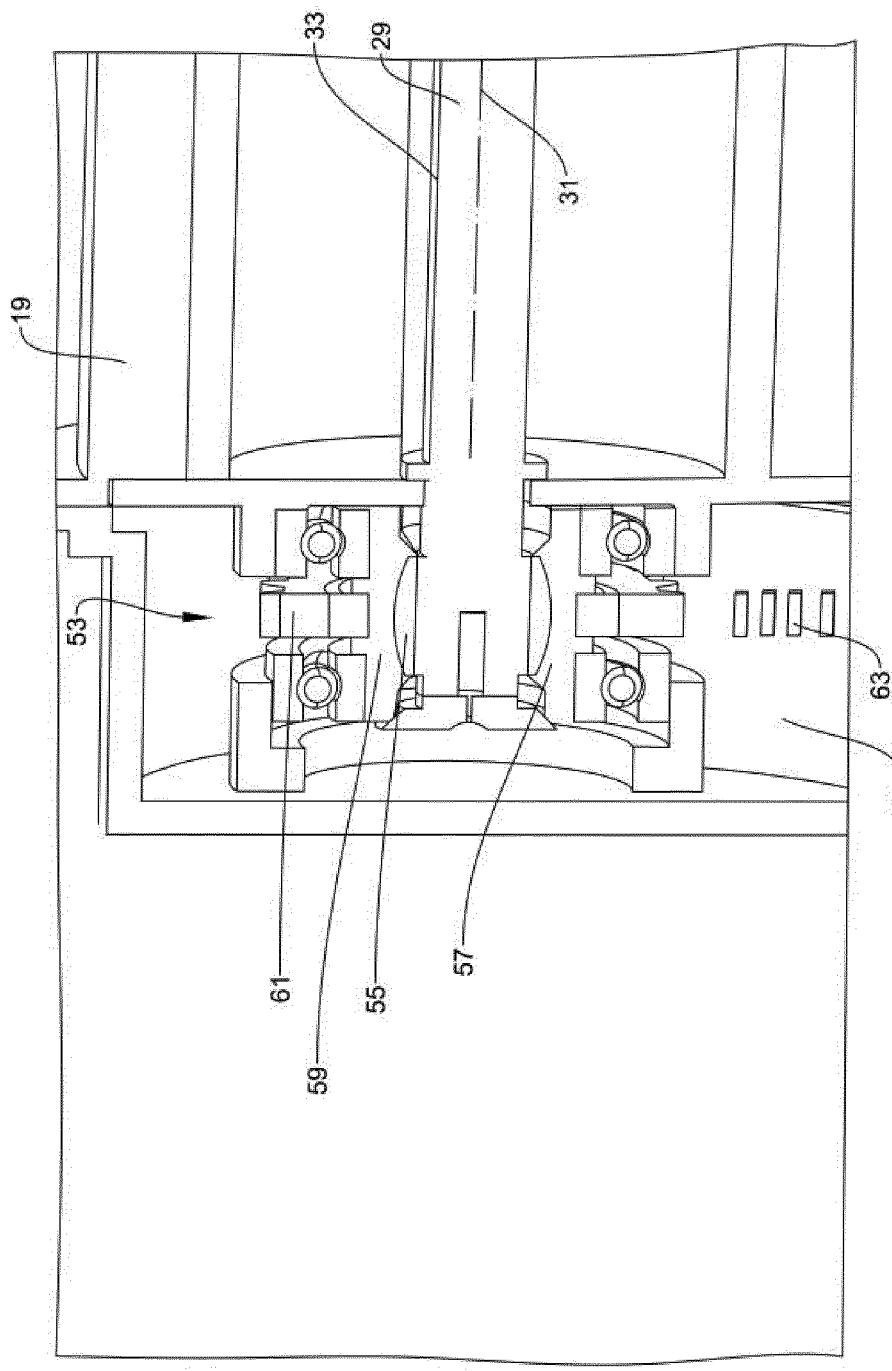

As shown in more detail in FIG. 4, the shaft 29 is rotationally driven by the motor 23 via a gear unit 51, wherein one end of the shaft 29 is coupled to the gear unit 51 via a crowned spline joint 53. Preferably, the crowned spline joint 53 includes a crowned spline 55 at the shaft 29 meshingly engaging with crowned internal teeth 57 of a corresponding internal gear wheel 59 of the gear unit 51 arranged coaxially around the one end of the shaft 29. The internal gear wheel 59 also has external teeth 61 which are engaged by a further gear wheel 63 of the gear unit 51.

Figure 5:
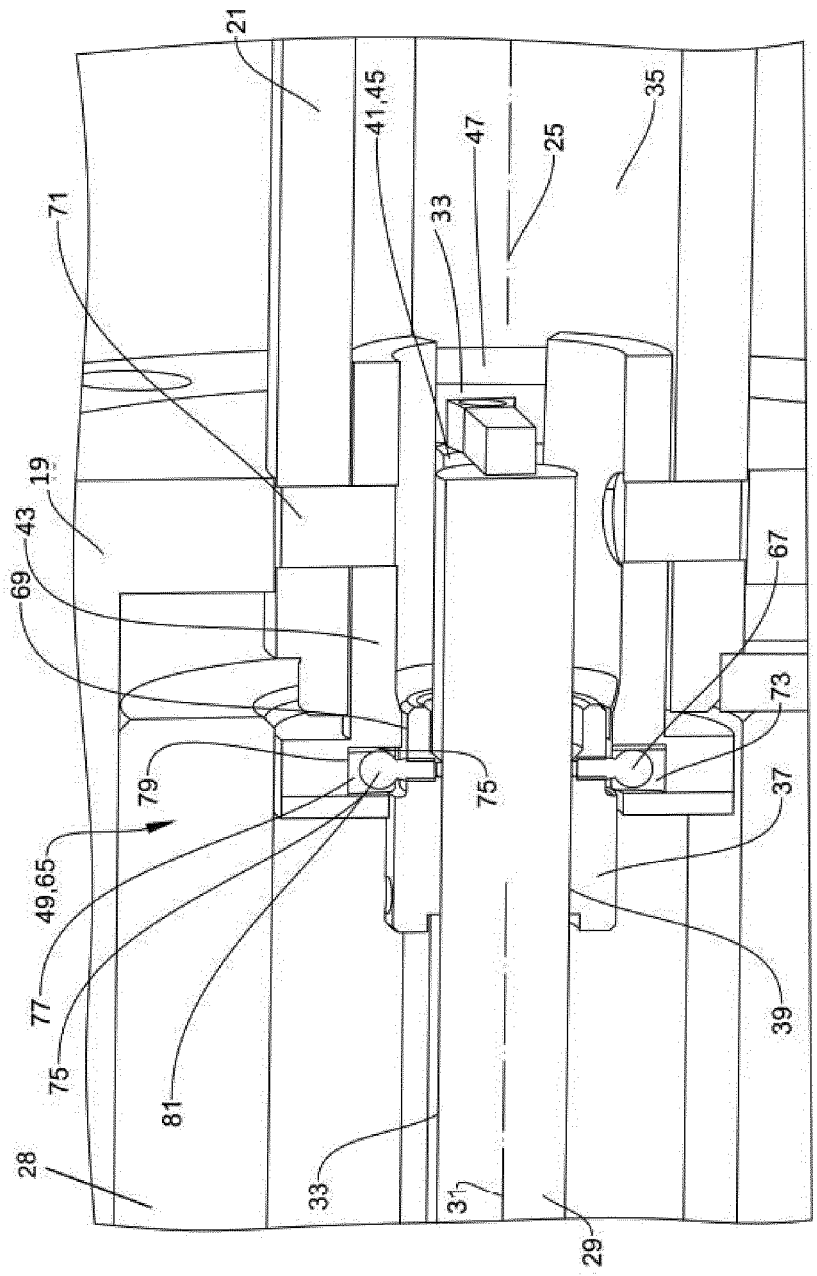

As shown in more detail in FIG. 5, the compensational bearing 49 is formed as a compensational ball stud bearing 65 which provides axial coupling along the shaft axis 31 and the latch axis 25, rotational coupling about the shaft axis 31 and the latch axis 25, and angular play, i.e. pivot play, between the nut 37 and the latch bolt 21. The ball stud bearing 65 comprises four ball studs 67 mounted to the nut 37 and projecting away from an outer surface 69 of the nut 37 in a radial direction. The ball stud bearing 65 further comprises the carrier sleeve 43 that is fixedly connected to the latch bolt 21 via pins 71 to ease dismounting for maintenance reasons. The carrier sleeve 43 extends coaxially inside the latch bolt 21 and in a partially overlapping manner coaxially around the nut 37. The carrier sleeve 43 further has four bearing cavities 73 extending in the radial direction, opening inwards, and receiving the corresponding ball studs 67 with a defined play in the axial, circumferential and radial directions. Each bearing cavity 73 comprises two parallel flat axial bearing surfaces 75 extending perpendicular to the latch axis 25, two opposite flat circumferential bearing surfaces 77 extending in a radial cross section along the latch axis 25, and one circular radial bearing surface 79 extending circumferentially perpendicular to the radial direction of the carrier sleeve 43.

In the present embodiment, the ball studs 67 and the bearing cavities 73 are arranged in two opposite pairs that are arranged symmetrically to one another around the circumference of the nut 37. The circumferential distance within one pair is smaller than the distance between the pairs, i.e. from one pair to another. Further, the ball studs 67 have the form of a pin anchored in the nut 37 by its one end and having an extended head 81 in the form of a ball at its opposite end.

In such a way, a flight latch device 17 is provided that provides a very efficient offset compensation.

The invention claimed is:

1. A wing for an aircraft, comprising:
   a fixed wing,
   a foldable wing tip portion mounted to the fixed wing via a hinge rotatable about a hinge axis between an extended position and a folded position, and
   a flight latch device for latching the foldable wing tip portion in the extended position,
   wherein the flight latch device comprises a housing mounted to one of the fixed wing and the foldable wing tip portion, a latch bolt supported at the housing and linearly movable relative to the housing between a latched position and an unlatched position, and a motor for driving the latch bolt between the latched and unlatched positions,
   wherein the flight latch device comprises a threaded shaft having an external thread and being rotationally driven by the motor,
   the flight latch device comprises a nut having an internal thread engaging the external thread of the shaft, so that the nut can rotate relative to the shaft along the external thread,
   the nut is connected to the housing via a linear guide allowing linear movement and inhibiting rotation of the nut relative to the housing, the nut is connected to the latch bolt for common linear movement with the latch bolt, and
   the flight latch device comprises an offset compensation, wherein the shaft is supported pivotable relative to the housing and the latch bolt is coupled to the nut via a compensational bearing allowing angular play between the nut and the latch bolt.

2. The wing according to claim 1, wherein the shaft is formed as ball screw and the nut is formed as ball nut so that the internal thread of the nut engages the external thread of the shaft by a ball bearing.

3. The wing according to claim 1, wherein the latch bolt has an axial bore, and wherein the shaft extends inside the bore.

4. The wing according to claim 1, wherein the shaft is rotationally driven by the motor via a gear unit, wherein the shaft is coupled to the gear unit via a crowned spline joint.

5. The wing according to claim 1, wherein the compensational bearing is formed as a compensational ball bearing providing axial coupling, relative rotation, and angular play between the nut and the latch bolt.

6. The wing according to claim 5, wherein the nut is directly connected to the linear guide, wherein the linear guide comprises a slider mounted to one of the nut and the housing, and running in a corresponding groove in the respective other of the nut and the housing.

7. The wing according to claim 1, wherein the compensational bearing is formed as a ball stud bearing providing axial coupling, rotational coupling, and angular play between the nut and the latch bolt.

8. The wing according to claim 7, wherein the ball stud bearing comprises at least one ball stud mounted to the nut and projecting away from an outer surface of the nut in a radial direction,
   wherein the ball stud bearing further comprises a carrier sleeve fixedly connected to the latch bolt, extending coaxially around the nut, and having at least one bearing cavity receiving the at least one ball stud with a defined play in axial, circumferential and radial direction.

9. The wing according to claim 8, wherein the ball stud bearing comprises four ball studs at the nut and corresponding bearing cavities at the carrier sleeve.

10. The wing according to claim 9, wherein the ball studs and bearing cavities are arranged equally spaced from one another in the circumferential direction.

11. The wing according to claim 10, wherein the ball studs and bearing cavities are arranged in two opposite pairs, while the distance between the ball studs within one pair is smaller than the distance between different pairs.

12. The wing according to claim 9, wherein the ball studs have the form of a pin having an extended head in the form of a ball.

13. The wing according to claim 7, wherein either the nut is directly connected to the linear guide, wherein the linear guide comprises a slider mounted to one of the nut and the housing, and running in a corresponding groove in the respective other of the nut and the housing, or
   wherein the nut is indirectly connected to the linear guide through the latch bolt, wherein the linear guide comprises a slider mounted to one of the latch bolt and the housing, and running in a corresponding groove in the respective other of the latch bolt and the housing, while the latch bolt in turn is coupled to the nut, or
   wherein the nut is indirectly connected to the linear guide through the carrier sleeve, wherein the linear guide comprises a slider mounted to one of the carrier sleeve and the housing, and running in a corresponding groove in the respective other of the carrier sleeve and the housing, while the carrier sleeve in turn is coupled to the nut.

14. An aircraft comprising the wing according to claim 1.

15. A flight latch device for latching a foldable wing tip portion of a wing for an aircraft in an extended position relative to a fixed wing,
   wherein the flight latch device comprises a housing configured for being mounted to one of the fixed wing and the foldable wing tip portion, a latch bolt supported at the housing and linearly movable relative to the housing between a latched position and an unlatched position, and a motor for driving the latch bolt between the latched and unlatched positions,
   wherein the flight latch device comprises a threaded shaft having an external thread and being rotationally driven by the motor, the flight latch device comprises a nut having an internal thread engaging the external thread of the shaft, so that the nut can rotate relative to the shaft along the external thread,
   the nut is connected to the housing via a first linear guide allowing linear movement and inhibiting rotation of the nut relative to the housing,
   the nut is connected to the latch bolt for common linear movement with the latch bolt, and
   the flight latch device comprises an offset compensation, wherein the shaft is supported pivotable relative to the housing and the latch bolt is coupled to the nut by a compensational bearing allowing angular play between the shaft and the latch bolt.

16. An aircraft comprising the flight latch device according to claim 15.

* * * * *